(12) United States Patent
Zhou et al.

(10) Patent No.: US 9,020,493 B2
(45) Date of Patent: Apr. 28, 2015

(54) VALIDITY TIME CONFIGURATION FOR IMMEDIATE MDT REPORTING

(75) Inventors: Wei Hua Zhou, Beijing (CN); Yi Zhang, Beijing (CN); Malgorzata Tomala, Nowe Miasto nad Pilica (PL)

(73) Assignee: Nokia Solutions and Networks Oy, Espoo (FI)

( * ) Notice: Subject to any disclaimer, the term of this patent is extended or adjusted under 35 U.S.C. 154(b) by 236 days.

(21) Appl. No.: 13/638,797

(22) PCT Filed: Apr. 1, 2010

(86) PCT No.: PCT/CN2010/000423
§ 371 (c)(1),
(2), (4) Date: Nov. 13, 2012

(87) PCT Pub. No.: WO2011/120199
PCT Pub. Date: Oct. 6, 2011

(65) Prior Publication Data
US 2013/0065535 A1    Mar. 14, 2013

(51) Int. Cl.
*H04W 24/00* (2009.01)
*H04W 16/18* (2009.01)
*H04L 12/26* (2006.01)

(52) U.S. Cl.
CPC ............. *H04W 16/18* (2013.01); *H04L 43/067* (2013.01)

(58) Field of Classification Search
CPC ............................ H04W 24/10; H04B 17/0042
USPC .................................. 455/423, 422.1, 67.11
See application file for complete search history.

(56) References Cited

U.S. PATENT DOCUMENTS

| 8,731,543 B2* | 5/2014 | Jung et al. ..................... 455/423 |
| 2011/0199923 A1* | 8/2011 | Persson et al. ................ 370/252 |
| 2011/0201279 A1* | 8/2011 | Suzuki et al. .............. 455/67.11 |

FOREIGN PATENT DOCUMENTS

CN    1941985 A    4/2007

OTHER PUBLICATIONS

R2-093232, 3GPP TSG-RAN WG2 Meeting #66, San Francisco, CA, May 4-8, 2009, "UE measurements and data reporting for minimization of drive tests" Nokia Corporation, Nokia Siemens Networks, 3 pgs.
R2-095640, 3GPP TSG-RAN WG2 Meeting #67bis, Miyazaki, Japan, Oct. 12-16, 2009, "Time stamp for minimization of drive test", Nokia Corporation, Nokia Siemens Networks Oy, 3 pgs.

* cited by examiner

*Primary Examiner* — Sonny Trinh
(74) *Attorney, Agent, or Firm* — Harrington & Smith

(57) ABSTRACT

The present invention provides a method, apparatus, and a computer program product for performing one or more minimizing drive test (MDT) measurements, defining a validity time threshold for each kind of MDT measurement, verifying, prior to reporting one of the MDT measurement results, whether the validity time threshold defined for the respective MDT measurement result to be reported, is exceeded, and, if the validity time threshold is not exceeded, reporting the MDT measurement result.

13 Claims, 2 Drawing Sheets

VALIDITY TIME CONFIGURATION FOR IMMEDIATE MDT REPORTING

FIELD OF THE INVENTION

The present invention relates to the minimization drive test (MDT) measurement report interpretation on environments such as 3G and Long Term Evolution LTE(-A). The present invention further relates to components like MDT capable user equipment (UE) and base stations (such as RNC (radio network controller) and eNB (enhanced NodeB)).

BACKGROUND OF THE INVENTION

Recently, minimizing drive tests (MDT) have been addressed in 3GPP RAN WG2. The ongoing work is aiming to define automatic collection of UE (user equipment) measurements, to enable easier monitoring of network performance and consequently to replace expensive drive-tests performed by operators manually. Since the functionality requires relevant input from the terminal, an involvement of the UEs is evident.

Currently, in 3GPP two MDT reporting approaches exist. One is Immediate MDT reporting. Immediate MDT reporting means that the UE needs to report MDT measurement immediately to the base station right after MDT measurement is done. In this case, the UE does not put a time stamp to the MDT measurement report, but instead the base station is required to do so based on its own time clock. The assumption behind is that MDT measurement reporting can be done successfully at any time, if capable UE wants to do it. Then, the time of receiving this MDT measurement report from UE at the base station can be used as time stamp of this MDT measurement report.

However, it is not clearly defined what "immediate" means and how to guarantee that a MDT measurement is reported "immediate enough".

Another approach is Logged MDT reporting. In this case, an UE, which is in an idle mode, will also do some MDT measurements and report the results to the network when it gets connection to the network again. Since the base station cannot use its own time for time stamp of this kind of MDT measurement report, the UE needs to put the time stamp to every MDT measurement report. In Logged MDT reporting, a ring buffer could be provided and the ring buffer is re-used by re-writing its contents in a circular manner. In this way, old entries of measurement results are periodically deleted. However, in such a way, old entries are only deleted in case there is a new measurement.

As to immediate MDT reporting, in some cases, an UE which is configured to perform immediate MDT reporting in connected mode may not be able to report MDT measurement to the base station immediately after this MDT measurement is done, for example in case of a radio link failure (RLF), lack of uplink (UL) resource, software problems in UE, or any other reason. Consequently, there might be a case that the UE encountering such a problem may report an "outdated" data, which will be completed by "current" time information.

In this case, a relative long time period may be gone before the base station receives this MDT measurement report from the UE. If then the base station still uses its local time as the time stamp of this MDT measurement report, potential wrong result maybe got by later offline post processing to these MDT measurement reports, since the deviation on timing of MDT measurement done there will be too big.

SUMMARY OF THE INVENTION

In order to solve these problems, according to the present invention, there are provided a method, apparatus and computer program product for validity time configuration for immediate MDT reporting.

According to an aspect of the invention there is provided a method comprising:
  performing one or more minimizing drive test (MDT) measurements;
  defining a validity time threshold for each kind of MDT measurement;
  verifying, prior to reporting one of the MDT measurement results, whether the validity time threshold defined for the respective MDT measurement result to be reported, is exceeded; and,
  if the validity time threshold is not exceeded, reporting the MDT measurement result.

According to further refinements of the invention as defined under the above aspects, the method further comprises,
  if the validity time threshold is exceeded, deleting the corresponding MDT measurement result;
  if the validity time threshold is exceeded, adding a time stamp to the MDT measurement result, and
  reporting the MDT measurement result including the added time stamp;
  wherein the time stamp indicates the measurement time, being defined as:

"time stamp=current time−validity time threshold";
  and for each of the MDT measurements a different validity time threshold is defined.

According to another aspect of the invention there is provided an apparatus comprising:
  a measuring unit configured to perform one or more minimizing drive test (MDT) measurements;
  a defining unit configured to define a validity time threshold for each kind of MDT measurement;
  a verifying unit configured to verify, prior to reporting one of the MDT measurement results, whether the validity time threshold defined for the respective MDT measurement result to be reported, is exceeded; and
  a reporting unit configured to report, if the validity time threshold is not exceeded, the MDT measurement result.

According to further refinements of the invention as defined under the above aspects, the apparatus further comprises
  a deleting unit configured to delete, if the validity time threshold is exceeded, the corresponding MDT measurement result;
  an adding unit configured to add, if the validity time threshold is exceeded, a time stamp to the MDT measurement result, wherein
  the reporting unit is configured to report the MDT measurement result including the added time stamp;
  the time stamp indicates the measurement time, being defined as:

"time stamp=current time−validity time threshold";
  and the defining unit is configured to define a different validity time threshold for each of the MDT measurements.

According to a still further aspect of the invention there is provided a computer program product including a program for a processing device, comprising software code portions for performing the steps of the methods as defined above when the program is run on the processing device.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to still another aspect of the invention there is provided an apparatus comprising:
 measuring means for performing one or more minimizing drive test (MDT) measurements;
 defining means for defining a validity time threshold for each kind of MDT measurement;
 verifying means for verifying, prior to reporting one of the MDT measurement results, whether the validity time threshold defined for the respective MDT measurement result to be reported, is exceeded; and
 reporting means for reporting, if the validity time threshold is not exceeded, the MDT measurement result.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, embodiments of the present invention are described by referring to general and specific examples of the embodiments. It is to be understood, however, that the description is given by way of example only, and that the described embodiments are by no means to be understood as limiting the present invention thereto.

According to an embodiment of the present invention, if immediate MDT reporting is adopted, one validity time threshold, hereinafter referred to as T-MDT, for each kind of MDT measurement is defined. This validity time threshold T-MDT is configured with every immediate MDT measurement configuration.

Before the UE performs immediate reporting of the MDT measurement result, it verifies, for every MDT measurement result, whether the validity time threshold T-MDT has exceeded.

In the following, a specific example of the invention will be described with reference to FIGS. 1 and 2.

Figure 1:
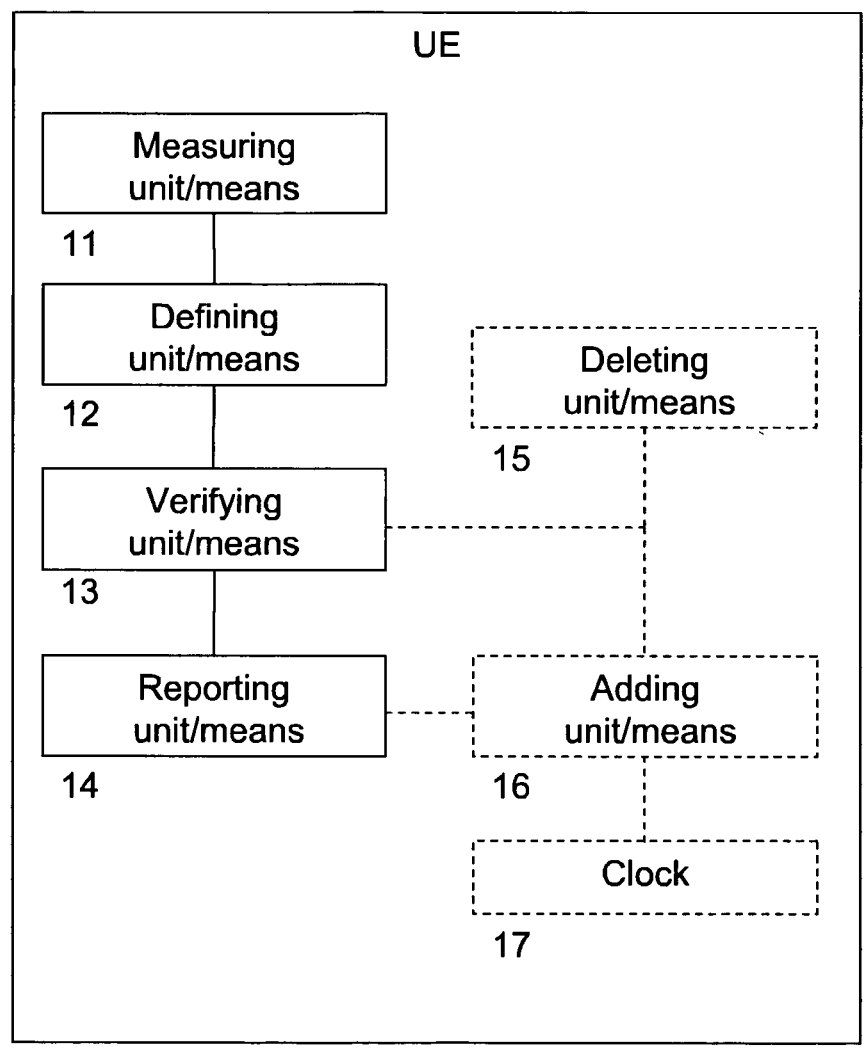
FIG. 1 is a block diagram showing an apparatus which may be a user equipment of a communication network according to an example of the present invention.

FIG. 1 is a block diagram showing an apparatus which may be a user equipment of a communication network according to an example of the present invention.

As shown in FIG. 1, the apparatus like, e.g., a user equipment, comprises a measuring unit 11, a defining unit 12, a verifying unit 13, and a reporting unit 14.

Figure 2:
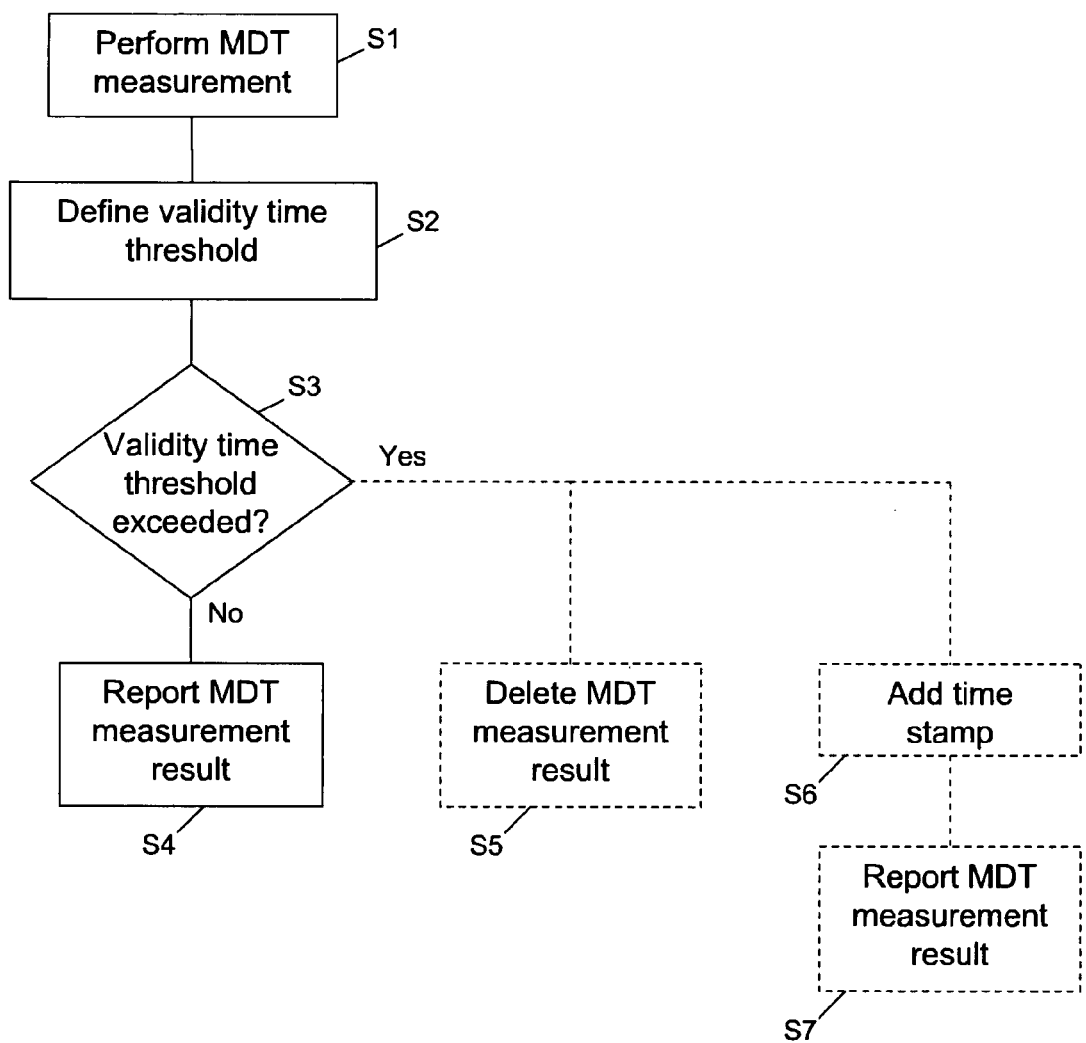
FIG. 2 is a flow chart illustrating a method of MDT reporting according to an example of the present invention.

FIG. 2 is a flow chart illustrating a method of MDT reporting according to an example of the present invention. FIG. 2 describes the corresponding steps that are performed by the respective units of the apparatus of FIG. 1.

Initially, the measuring unit 11 performs a MDT measurement (step S1) and the defining unit 12 defines a validity time threshold T-MDT for each MDT measurement result (step S2). Then, before reporting the MDT measurement result to a base station like e.g. a RNC in a 3G communication network or an eNB in a LTE(-A) communication network, the verifying unit 13 verifies whether the validity time threshold of the MDT measurement result to be reported has exceeded or not (step S3). If it is verified that the validity time threshold has not exceeded (step S3: No), the MDT measurement result corresponding to the validity time threshold is reported to the base station (step S4).

Optionally, the UE may further comprise a deleting unit 15. If it is verified that the validity time threshold has exceeded (step S3: Yes), the deleting unit 15 may delete the MDT measurement result corresponding to the validity time threshold, which has been verified as being lapsed (step S5).

Alternatively, to avoid deleting MDT reports, an extended solution can be implemented for the UEs. In such a case, although the measurement report scenario is such that the base station provides the time stamp, the UE may also be able to provide a timestamp itself.

Thus, as a further option, the UE may comprise an adding unit 16 and a clock 17. In such a case, if it is verified that the validity time threshold T-MDT has exceeded (step S3: Yes), the adding unit 16 may add a time stamp which is derived form the clock 17 to the MDT measurement result (step S6) and the reporting unit 14 may report the MDT measurement result including the added time stamp to the base station (step S7).

Such a time stamp indicates the measurement time which is defined as "current time−T-MDT".

Thus, if the UE finds that it cannot send the MDT measurement result when the validity time threshold T-MDT expires, it provides the timestamp "current time−T-MDT" as the measurement time, and thus, this MDT measurement result is still useful.

According to a further example, the UE may comprise both deleting unit 15 and adding unit 16 and may decide on a case by case basis whether to delete the measurement result or to report the measurement result having an additional time stamp.

In view of the above, it is evident that the UE may perform not only one MDT measurement but a plurality of MDT measurements. Then, different validity time thresholds may be defined for each MDT measurement.

Further, the present invention also relates to a base station, like e.g. a RNC or an eNB, which is capable of receiving and processing the MDT measurement result reported by the UE.

In summary, according to an embodiment of the present invention, the radio resource control (RRC) procedure used for immediate MDT configuration may comprise a validity timer T-MDT. The value of this timer might have a certain range in order to allow different configurations depending on operators needs. Also depending on network overload, there may be made a decision to reconfigure the value to keep the overhead signaling on a reasonable level.

Anyhow, it will resolve the uncertainty whether the MDT data are stamped by the network with correct time information. Thus, it will enable more efficient diagnosis of a certain problem, as the UE configuration will be specified clearly beforehand.

In other words, the invention provides means to verify whether the measurement report will be not misinterpreted by anticipated analyses and a method how the UE shall send the MDT reports when there is a delay between the time instants of the measurement and reporting of the measurement data.

The UE will be configured with a T-MDT timer, which can be measurement specific and which shall be used to determine whether the measurement is outdated or not. The result is considered outdated when the timer started at the measurement exceeds the T-MDT time value before the report is sent. The outdated data will be deleted, or in an alternative version of the method, the UE could report also "Current time−T-MDT time" as the time stamp for the reported data if the timer has expired.

In the foregoing exemplary description of the user equipment, only the units that are relevant for understanding the principles of the invention have been described using functional blocks. The user equipment may comprise further units that are necessary for their operation as user equipment, respectively. However, a description of these units is omitted in this specification. The arrangement of the functional blocks of the devices is not construed to limit the invention, and the functions may be performed by one block or further split into sub-blocks. For example, the measuring unit and the calculating unit can be combined into a single block performing the operations of both blocks, respectively.

For the purpose of the present invention as described herein above, it should be noted that

- method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the embodiments as described above, UE, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

It is noted that the embodiments and general and specific examples described above are provided for illustrative purposes only and are in no way intended that the present invention is restricted thereto. Rather, it is the intention that all variations and modifications be included which fall within the scope of the appended claims.

The invention claimed is:

1. A method comprising:
   performing one or more minimizing drive test (MDT) measurements;
   defining a validity time threshold for each kind of MDT measurement;
   verifying, prior to reporting one of the MDT measurement results, whether the validity time threshold defined for the respective MDT measurement result to be reported is exceeded; and
   if the validity time threshold is not exceeded, reporting the MDT measurement result.

2. The method according to claim 1, further comprising:
   if the validity time threshold is exceeded, deleting the corresponding MDT measurement result.

3. The method according to claim 1, further comprising:
   if the validity time threshold is exceeded, adding a time stamp to the MDT measurement result, and
   reporting the MDT measurement result including the added time stamp.

4. The method according to claim 3, wherein the time stamp indicates the measurement time being defined as:

$$\text{"time stamp=current time−validity time threshold"}.$$

5. The method according to claim 1, wherein for each of the MDT measurements a different validity time threshold is defined.

6. A computer program product comprising a non-transitory computer-readable storage medium bearing computer program code embodied therein for use with a computer, the computer program code comprising code for performing the method according to claim 1.

7. The computer program product according to claim 6, wherein the computer program code is directly loadable into an internal memory of the computer.

8. An apparatus comprising:
   at least one processor; and
   at least one memory including computer program code, the at least one memory and the computer program code configured, with the at least one processor, to cause the apparatus to perform the following:
   perform one or more minimizing drive test (MDT) measurements;
   define a validity time threshold for each kind of MDT measurement;
   verify, prior to reporting one of the MDT measurement results, whether the validity time threshold defined for the respective MDT measurement result to be reported is exceeded; and
   report, if the validity time threshold is not exceeded, the MDT measurement result.

9. The apparatus according to claim 8, wherein the at least one memory and the computer program code are further configured, with the at least one processor, to cause the apparatus to delete, if the validity time threshold is exceeded, the corresponding MDT measurement result.

10. The apparatus according to claim 8, wherein the at least one memory and the computer program code are further configured, with the at least one processor, to cause the apparatus to add, if the validity time threshold is exceeded, a time stamp to the MDT measurement result, and to report the MDT measurement result including the added time stamp.

11. The method apparatus according to claim 10, wherein the time stamp indicates the measurement time being defined as:

"time stamp=current time−validity time threshold".

12. The apparatus according to claim 8, wherein the at least one memory and the computer program code are further configured, with the at least one processor, to cause the apparatus to define a different validity time threshold for each of the MDT measurements.

13. An apparatus comprising:
   measuring means for performing one or more minimizing drive test (MDT) measurements;
   defining means for defining a validity time threshold for each kind of MDT measurement;
   verifying means for verifying, prior to reporting one of the MDT measurement results, whether the validity time threshold defined for the respective MDT measurement result to be reported, is exceeded; and
   reporting means for reporting, if the validity time threshold is not exceeded, the MDT measurement result.

* * * * *

UNITED STATES PATENT AND TRADEMARK OFFICE
CERTIFICATE OF CORRECTION

PATENT NO. : 9,020,493 B2  
APPLICATION NO. : 13/638797  
DATED : April 28, 2015  
INVENTOR(S) : Zhou et al.

Page 1 of 1

It is certified that error appears in the above-identified patent and that said Letters Patent is hereby corrected as shown below:

In the Claims

Claim 11, col. 7, line 10 "method" should be deleted in between "The" and "apparatus".

Signed and Sealed this  
Twenty-third Day of June, 2015

Michelle K. Lee  
*Director of the United States Patent and Trademark Office*